Nov. 17, 1959 T. L. McKAY ET AL 2,913,031
SELF-LOCKING SCREW THREADED FASTENER MEMBER
HAVING AN ELONGATED RESILIENT INSERT
Original Filed April 3, 1958 2 Sheets-Sheet 1

INVENTORS:
Thomas L. McKay
Harold LeRoy Oliver
Robin J. Starriett
By Smyth & Roston
Attorneys Nov. 17, 1959  T. L. McKAY ET AL  2,913,031
SELF-LOCKING SCREW THREADED FASTENER MEMBER
HAVING AN ELONGATED RESILIENT INSERT
Original Filed April 3, 1958  2 Sheets-Sheet 2
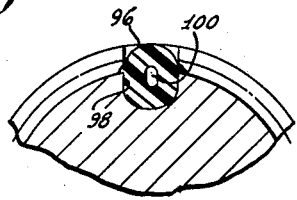
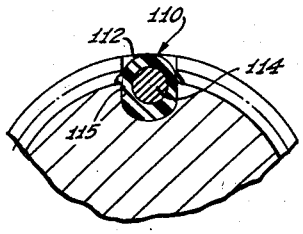
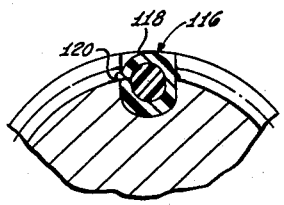
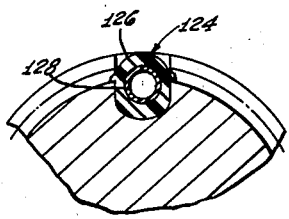
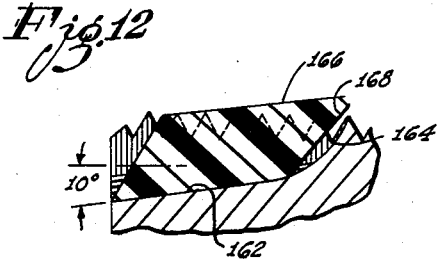
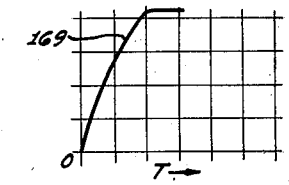
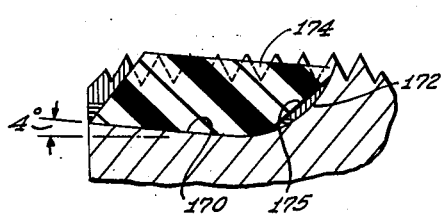
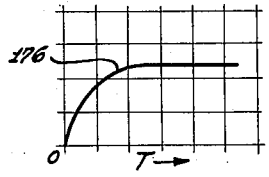
INVENTORS:
Thomas L. McKay
Harold LeRoy Oliver
Robin J. Starriett
By Smyth, Roston
Attorneys

# United States Patent Office 2,913,031
Patented Nov. 17, 1959

2,913,031

SELF-LOCKING SCREW THREADED FASTENER MEMBER HAVING AN ELONGATED RESILIENT INSERT

Thomas L. McKay and Harold LeRoy Oliver, Los Angeles, and Robin J. Starriett, Encino, Calif., assignors to Long-Lok Corporation, Santa Monica, Calif., a corporation of California Original application April 3, 1958, Serial No. 726,230. Divided and this application March 27, 1959, Serial No. 802,498

13 Claims. (Cl. 151—7)

This invention relates to self-locking screw threaded fastening members or devices of the type in which the self-locking action is achieved by means of a deformable insert body seated in a recess that cuts across the turns of the screw thread of the fastening member. The fastening member may be of the general character of a screw for engagement by a complementary nut or may be of the general character of a nut for engagement by a complementary screw. This application is a division of our co-pending application, Serial No. 726,230, filed April 3, 1958, entitled Self-Locking Screw Threaded Fastener Member.

The basic requisite of a self-locking fastening member of this type for use with a cooperating element having a complementary thread is the attainment of sufficiently effective frictional engagement with the complementary element to prevent loosening of the fastening member under the most adverse conditions, including conditions of repeated stress and vibration. In this regard, the invention is characterized by the concept of employing an insert of suitable deformable material in a longitudinal groove or slot of the fastening member in such manner that deformation of the insert material by the complementary thread of the cooperating element creates both an axial reaction thrust and a simultaneous lateral reaction thrust on the part of the fastening member.

The axial reaction thrust of the screw-threaded fastening member is usually the major factor in the locking of the member against rotation because the frictional areas under pressure from this thrust extend spirally around the whole internal or external circumference of the member for as many turns of the screw thread of the member as are engaged by the complementary thread of the cooperating element. The lateral thrust on the part of the fastening member always contributes substantially to the frictional locking effect, however, by increasing the pressure of the screw thread of the member against the complementary thread of the cooperating element in the longitudinal region that is diametrically opposite from the longitudinal insert. In addition, there is a third frictional-locking effect in the pressure contact between the insert itself and the impinging complementary thread of the cooperating element. These three frictional retentional effects are additive to making the installed screw-threaded fastening member immune to the loosening forces that are encountered under the most adverse service conditions.

One problem in the construction of such a self-locking screw fastening member with a longitudinal insert seated in a longitudinal groove therein is to mount the insert in the groove in such manner as to secure the insert effectively against accidental withdrawal laterally from the groove. A second problem is to anchor the insert in the groove in such manner as to overcome the tendency of the installed insert to be shifted bodily longitudinally of the groove by the cooperating threaded element when the screw-threaded fastening member and the cooperating element are screwed together. A third problem is to provide a screw fastening member with the longitudinal insert without undue weakening of the structure of the fastening member by the removal of metal to provide the longitudinal groove. A fourth problem is to cut the required longitudinal groove in the screw-threaded fastening member in a rapid and economical manner suitable for mass production at relatively low cost.

These four problems are interrelated and any solution for any one of the problems must take into consideration the remaining three problems. An insert may be anchored against lateral withdrawal by employing a longitudinal groove with overhanging side walls for dovetail engagement with the insert, but such a groove is not only difficult to cut but also involves removal of any undue amount of the metal. The tendency of the insert to shift longitudinally of the groove may be met by cutting a relatively deep groove with abrupt end walls or overhanging end walls, but here again, the cutting of such a groove is relatively expensive and involves the removal of an undue amount of metal.

In many practices of the invention, effective anchorage of the installed insert against lateral withdrawal from the longitudinal groove is accomplished by forcing into the groove an insert that is oversize in width relative to the groove so that the insert is squeezed under permanent lateral compression by the walls of the groove. In other practices of the invention other expedients may be employed to anchor the installed insert against lateral withdrawal, as will be apparent in the subsequent detailed description of the various forms of the invention.

With reference to anchoring the installed insert against longitudinal shift relative to the groove, the present invention teaches two solutions. These solutions may be used separately or may be used together.

One of these two solutions is to force an insert body of deformable material into the longitudinal groove with sufficient force to cause the insert body to be deformed by diametrical compression into interlocking engagement with the cut ends of the turns of the screw thread along the two longitudinal sides of the groove. The width of the deformable insert body prior to the installation step need not be greater than the width of the groove for this purpose, since the insert is spread by the diametrical compression. In any event, the insert as deformed by the lateral compression has portions extending laterally in both directions at longitudinally spaced points in positive engagement with the ends of the turns of the screw thread immediately adjacent the groove. This multiple-interlocking engagement by the insert with the cut ends of the turns of the screw thread by displacement of the material of the insert into the adjacent screw thread valleys is effective to prevent bodily longitudinal shift of the insert in the groove.

The second of the two solutions is to provide a groove of such depth and to use an insert body of such dimension in cross section that the insert is wider than the groove and the widest portion of the insert is not forced inward beyond the root diameter of the screw thread of the fastening member. The forcing of such an oversize insert between the cut ends of the turns of the screw thread along the two sides of the groove causes the screw thread ends to function as cutting elements to gouge out or displace corresponding portions of the insert at longitudinally spaced points along the opposite sides of the insert. In other words, the abrupt ends of the turns of the screw thread along the two sides of the groove serve as teeth to bite into the insert at longitudinally spaced points with consequent positive engagement therewith to interlock the insert with the screw thread to prevent longitudinal shift of the insert in the groove. This positive engagement with the screw threads ends at spaced points may be destroyed if the insert is forced radially past the root diameter of the screw thread to such extent as to disengage the insert from the ends of the screw thread, but it is a simple matter to dimension the insert and the groove to obtain the desired interlocking relationship.

The manner in which the installed insert is interlocked with the ends of the interrupted screw thread makes it possible to minimize the amount of material that must be removed to form the groove and also makes it possible to use a rapid, simple and inexpensive procedure for cutting the groove. In the preferred practice of the invention, the groove is cut by means of a side milling cutter rotating in a longitudinal plane, the cutter being advanced against the leading end of the screw-threaded fastening member and terminating short of the other end thereof. Thus, the side milling cutter forms a groove with a blind end and the blind end is tapered in accord with the radius of the side milling cutter.

Such a tapered end for the groove would ordinarily be undesirable because ordinarily the end of the groove would have the function of blocking longitudinal shift of the insert. With the interlocking of the insert with the cut ends of the screw thread at spaced points, however, it is not necessary for the groove end to function for this purpose.

In most practices of the invention, the resiliency of the insert is an important factor if not the dominant factor in the self-locking action as well as retention of locking of the locking element in the groove. For this purpose, the insert may be made of a suitably resilient plastic material, and in some instances the plastic insert is fabricated with a relatively hard core. A resilient plastic insert body suitable for the invention may be made of various types of nylon or may be made of various other plastic materials of the same general character, including the plastic resin that is available under the trade name KEL-F.

The interlocking of such a resilient plastic insert with the screw thread of the fastening member at multiple points on both sides of the insert, in effect, divides the insert into a longitudinal series of independent zones which contribute by resilient action to a cumulative over-all axial thrust reaction in the part of the fastening member. This cumulative action by longitudinal series of independent resilient zones may be understood when it is appreciated that when the fastening member is engaged with a cooperating threaded element, the helical advance of the complementary thread of the cooperating element into the resilient insert tends to displace the insert bodily longitudinally of the groove but in each instance where a turn of the complementary thread has this longitudinal displacement effect, longitudinal displacement is resisted locally by local anchorage of the insert in the adjacent valleys of the turns of the screw thread of the fastening member. Consequently, in each instance, the insert is locally resiliently distorted with a portion of the insert material under stress between a turn of the complementary thread of the cooperating element and portions of an adjacent turn of a screw thread of the fastening member on opposite sides of the groove. Thus, the resilient plastic insert functions, in effect, as a series of relatively short spring elements instead of functioning as a single relatively long spring element. In this manner, a resilient insert of the invention produces an axial thrust reaction of exceptionally high magnitude.

In many instances, it is desirable to employ a hollow insert body to permit inward displacement of the insert material by the complementary thread of the cooperating member. Thus, some practices of the invention utilize a plastic insert of generally tubular configuration.

For the present purpose of disclosure and to illustrate the principles involved, the invention is described herein as applied in various ways to the construction of a self-locking screw member or device for use with a cooperating element such as a nut or tapped hole having a female screw thread. The disclosure of these various forms will provide adequate guidance for those skilled in the art who may have occasion to apply the same principles to the construction of screw-threaded fastening members in the form of a nut or the like for cooperation with a screw having a complementary male thread.

The various features and advantages of the invention will be apparent from the following detailed description considered with the accompanying drawings.

In the drawings, which are to be regarded as merely illustrative:

Fig. 8 is a transverse sectional view showing an insert in the form of a hollow body of plastic material;

Fig. 9 is a transverse sectional view showing an insert comprising a plastic sheath encasing a metal core;

Fig. 10 is a similar view showing a tubular sheath of one plastic material encasing a core of a different plastic material;

Fig. 11 is a fragmentary transverse sectional view showing an insert comprising a tubular plastic body with a core therein in the form of a metal tube;

Fig. 12 is a fragmentary longitudinal sectional view showing a plastic insert mounted in a longitudinal groove that has a bottom wall inclined at an angle to the axis of the screw to create resistance to the threading of the screw into a nut with the resistance arising initially abruptly to a relatively high magnitude;

Fig. 13 is a graph showing the abrupt rise in resistance to a high magnitude as the screw of Fig. 12 is threaded into a complementary nut;

Figure 1:
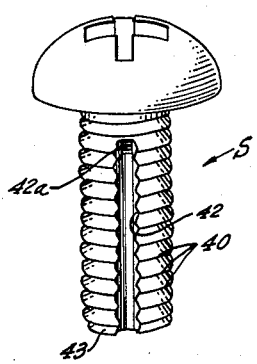
Fig. 1 is a perspective view of a self-locking screw embodying a selected practice of the invention, the view showing the longitudinal groove in the screw without the insert.
Figure 2:
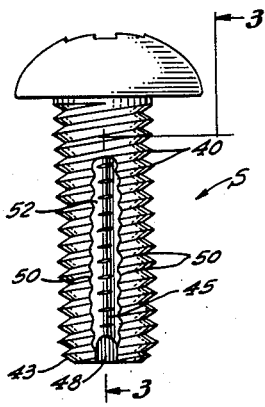
Fig. 2 is a side elevational view of the self-locking screw with the deformed insert body in the groove.

Fig. 14 is a longitudinal sectional view of a plastic insert in a groove in a screw with the groove bottom inclined in the opposite direction to result in rise of the resistance to a moderate magnitude which magnitude is substantially maintained as the screw continues to be tightened in the cooperating nut; and Fig. 15 is a graph showing the rise in resistance that occurs when a screw of the construction shown in Fig. 14 is tightened with respect to a cooperating nut.

Figs. 1–5 show how the invention may be applied to the fabrication of a well-known type of screw, generally designated by the letter S, the shank of the screw being formed with a conventional screw thread 40. In accord with the invention, a slot or groove 42 is cut or formed longitudinally in the shank of the screw. Such a groove may be of any length and may be formed in various ways in various practices of the invention.

In this particular practice of the invention, the groove 42 extends to and opens on the leading end of the screw shank, which leading end has a taper or chamfer 43. In this instance, the groove 42 is cut in the screw shank by means of a side milling cutter which is indicated in phantom at 44 in Fig. 3. The milling cutter 44 rotates in a plane that is substantially parallel with the axis of the screw shank and the cutter is advanced inwardly from the leading end of the screw to provide a groove of the desired length. The use of a side milling cutter in this manner results in the groove 42 having a tapered end 42a that is curved in accord with the configuration of the milling cutter 44. The groove 42 is relatively narrow and relatively shallow and, therefore, does not materially weaken the screw.

In accord with the invention, a suitable insert body 45 is seated in the groove 42 longitudinally thereof. Such an insert may be made of various materials for various purposes. Thus, the insert 45 may be made of suitable plastic materials for service at moderate temperatures or may be made of suitable metals for high temperature conditions.

Figure 3:
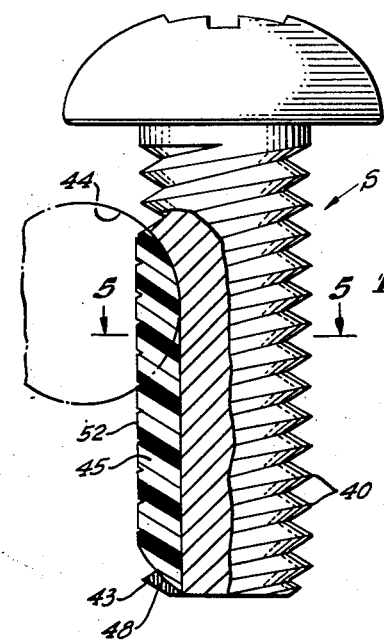
Fig. 3 is a view of the finished self-locking screw on an enlarged scale, the view being partly in elevation and partly in section with the section taken as indicated by the angular line 3—3 of Fig. 2.

As shown in Fig. 3, preferably the inner end of the insert 45 is cut with a flat taper 46 to conform to the tapered inner end 42a of the groove 42 in the sense that the flat insert taper 46 corresponds generally to the core of the arc of the groove surface 42a. In this regard, a feature of the invention is that the other outer end of the insert 45 has a flat tapered surface 48 that is parallel with the tapered surface 46, both tapered surfaces at the ends of the insert being inclined at the same angle relative to the longitudinal axis of the insert. As may be seen in Fig. 3, the tapered surface 48 forms a leading nose for the insert 45 that is inside the taper or chamfer 43 of the screw end, this configuration of the insert facilitating initial engagement of the screw with a threaded female member.

Figure 5:
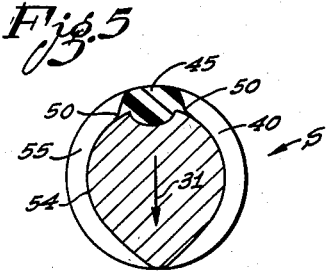
Fig. 5 is a transverse section of the finished self-locking screw taken as indicated by the line 5—5 of Fig. 3.
Figure 4:
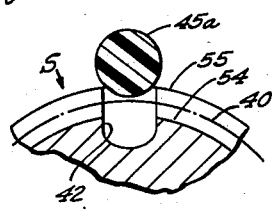
Fig. 4 is a fragmentary transverse sectional view showing the relationship between the cross sections of the groove and the cross section of the blank insert.

Fig. 4 shows how a plastic insert body of round cross-sectional configuration and of larger diameter than the groove 42 may be positioned for insertion in the groove, and Fig. 5 shows how such an insert is deformed when it is forced into the groove. It can be seen in Fig. 5 that the insert 45 completely fills the groove 42 and extends radially outward approximately to the outer circumference of the crest of the screw thread 40. In addition to filling the groove 42 completely, the insert 45 has marginal portions 50 that protrude laterally into engagement with the valleys of the turns of the screw thread 40 at multiple spaced points on each side of the groove. Thus, the marginal protruding portions 50 form multiple pairs of anchorages to retain the insert 45 against longitudinal bodily movement or shift relative to the groove 42.

When the screw S is threaded into a female element such as a nut, the penetration of the complementary thread of the female element into the material of the insert 45 at longitudinally spaced points of the insert tends to shift the insert longitudinally in the groove 42 towards the head of the screw, but the multiple anchorages provided by the marginal portions 50 prevent such longitudinal shift. Thus, the female thread creates a local longitudinal distortion of the insert in the region of each turn of the screw thread to result in a cumulative longitudinal reaction thrust by the plastic insert which reaction is transmitted to the screw S and causes the male thread 40 to thrust axially against the female thread. Since a plurality of complete turns of both threads are involved, this axial reaction thrust involves the pressure engagement of a relatively large total area of thread surfaces.

Since the plastic insert 45 substantially completely fills the groove 42 and extends radially outward to the outer circumference of the thread 40, i.e., the major diameter of the screw, the insertion of the screw S into a female member with consequent radially inward resilient deformation of the insert creates a lateral diametrical reaction thrust as indicated by the arrow 51 in Fig. 4. This sidewise thrust of the screw S presses the male thread 40 against the surrounding female thread throughout a longitudinal zone that is diametrically opposite from the longitudinal zone of the insert 45.

It is readily apparent that the above described axial reaction thrust of the screw, together with the described lateral reaction thrust, creates effective frictional engagement between the thread 40 of the screw and the surrounding female thread to lock the screw frictionally against loosening or retraction from the female member into which it is inserted. In addition, of course, the pressural engagement of the elastically deformed insert 45 with the threads of the female member further resists loosening rotation of the screw S.

Since the insert 45 is anchored in the groove 42 against radial withdrawal by lateral pressure contact with the side walls of the groove and since the insert is held against longitudinal bodily shift in the groove by the anchoring marginal portions 50, the insert may be substantially shorter than the groove. A further feature of the invention in this regard is that the inner end of the insert 45 need not abut the end 42a of the groove.

A further feature of this particular practice of the invention is that the operation of forcing the plastic insert 45 into the groove 42 is utilized to partially preform the insert in the sense of giving the outer exposed surface of the insert a serrated configuration that approaches, but does not quite match, the configuration to which the insert will be ultimately deformed by the female thread of a cooperating nut or the like. Thus, the insert body 45 may be partially preformed to the extent of having a series of longitudinally spaced transverse indentations 52 that correspond to the deeper indentations that will be formed ultimately by the cooperating female thread.

In Fig. 5 illustrating the use of a plastic insert, the groove 42 has a width of .040"±.001 and the bottom wall 52 of the groove is curved circumferentially at a radius of curvature of .030". The groove extends, of course, to the outer circumference of the thread of the screw S and the depth of the groove measured to the center of its curved bottom is .048"±.002. The blank insert body 45a is a solid cylinder having a diameter of .048"±.002.

With these dimensional relationships, the diameter of the insert blank 45a is approximately 20% greater than the width of the slot 42 to insure substantial lateral compression of the insert material by the slot. Also by virtue of these dimensional relationships the cross-sectional area of the blank insert 45a is approximately 10% greater than the cross-sectional area of the groove 42 so that when the insert blank is forced into the groove there is enough surplus insert material to form the desired multiple marginal protuberances 50. When the blank insert 45a is inserted into the groove 42 with sufficient force to exceed the elastic limits of the plastic material and thus deform the plastic material permanently, the inserted is automatically molded to the desired configuration by the screw slot and the adjacent portions of the screw thread 40.

The force applied for this purpose of seating and shaping the blank insert may be more or less gradually applied pressure. In the preferred practice of the invention, however, the required seating and shaping pressure is applied abruptly by impact means.

As heretofore stated, the interlocking engagement of the insert with the turns of the screw thread to prevent longitudinal shift of the insert relative to the groove may be accomplished by deforming the insert by diametrical compression and/or by deformation accomplished by causing the cut ends of the turns of the screw thread to bite into the material of an insert that is oversized in width relative to the width of the goove. Both of these methods of providing interlocking engagement of the insert with the screw thread are involved in the configuration of the insert 45 shown in Fig. 5, as will now be explained.

It can be seen in Fig. 4 that the diameter of the insert blank 45a is larger than the width of the groove 42. Consequently, when the insert blank 45a makes initial contact with the ends of the turns of the screw thread 40 along the two sides of the groove, the screw thread ends cut or gouge out portions of the insert and thereby make interlocking engagement with the insert. If the portion of the insert blank 45a that is wider than the width of the groove 42 is forced into the groove beyond the root diameter, i.e., the minor diameter 54 in Fig. 4, the interlocking engagement accomplished by the cutting action of the screw thread ends disappears. It is apparent in Figs. 4 and 5, however, that the movement of the insert blank radially inward of the screw S stops short of this point at which this interlocking disappears.

When the insert blank 45a is seated in the groove 42 in this interlocking manner in snug contact with the bottom surface of the groove, a portion of the insert lies radially outwardly from the major diameter 55 of the screw, i.e., the diameter defined by the crest of the screw thread 40. The procedure of installing the insert blank 45a includes the final step of subjecting the insert blank to diametrical compression, i.e., pressure radially inwardly of the screw S. As a result, the insert is distorted by compression to the final configuration shown in Fig. 5 in which the outer surface of the insert is substantially at the major diameter 55. It may be readily appreciated that this final flattening of the configuration of the insert results in additional displacement of the material of the insert laterally into the valleys of the turns of the screw thread. Thus, in Figs. 2 and 5, the marginal portions 50 of the insert 45 that protrude laterally into engagement with the valleys of the turns of the screw thread 40 are formed, in part, by the initial biting action of the screw thread ends and are formed, in further part, by the final flattening of the seated insert.

Figure 6:
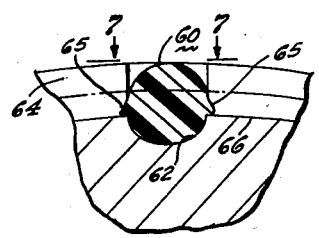
Fig. 6 is an enlarged fragmentary transverse section of the screw with an insert comprising a solid plastic body interlocked with the screw by the cutting action of the abrupt ends of the turns of the screw thread along the two sides of the groove.

Fig. 6 shows a plastic insert 60 in a longitudinal groove 62 in a screw and exemplifies the manner in which an insert may be interlocked with the screw solely or at least primarily by virtue of the ends of the turns of the screw thread adjacent the groove functioning as teeth to bite into the sides of the insert when the insert is forced into the groove. The plastic insert 60 extends out to the crest of the screw thread 64 with the underside of the insert resting on the bottom of the groove 62.

The diameter of the insert 60 prior to its installation is slightly greater than the width of the groove 62. Thus, the gap across the groove 62 between the cut ends of the turns of the screw thread 64 is less than the diameter of the insert. Consequently, the ends of the turns of the screw thread 64 displace corresponding portions of the plastic insert, the character of the displacement of the material depending primarily on the character of the material. Thus, if the insert 60 is highly resilient, the insert may be resiliently constricted by the screw thread ends with resulting bulging of the insert into the valleys of the screw thread, the bulging accomplishing the desired interlocking relationship with the screw thread. On the other hand, the ends of the turns of the screw thread 64 may gouge out portions of the sides of the insert to result in the same interlocking relationship. In either event, side portions 65 of the insert extend into the valleys of the screw thread 64.

In Fig. 6, the portion of the insert 60 that is wider than the groove 62 is outside the root diameter, i.e., the minor diameter 66 of the screw, this relationship being necessary for the interlocking action that is achieved solely by the biting effect of the screw thread ends. If the groove 62 were made deeper so that the portions of the insert that are wider than the groove were inside the minor diameter 66, this interlocking effect would disappear because the valleys of the screw thread would either shear off the bulging portions or cause the bulging portions to be compressed by the walls of the groove inside the minor diameter.

Figure 7:
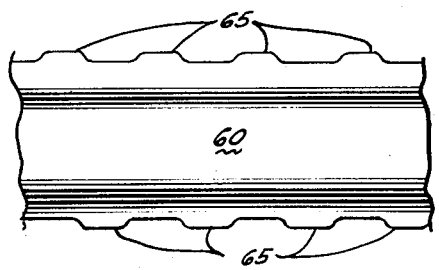
Fig. 7 is a greatly enlarged fragmentary plan view of the installed insert as seen along the line 7—7 of Fig. 6.

Fig. 7 is an enlarged fragmentary plan view of the insert 60 in Fig. 6. This view shows in an exaggerated manner how the insert is formed with bulging side portions 65 that extend into the valleys of the screw thread for interlocking the insert with the screw.

Fig. 8 shows how a hollow insert 96 of suitable plastic material may be mounted in a groove 98 to extend radially outward to approximately the major diameter of the screw thread. The plastic insert 96 is a tubular configuration, being formed with a relatively small axial passage 100. The provision of the axial passage 100 provides an interior space into which the material of the insert may be displaced by inward flexure. In this instance, the hollow insert 96 in its unrestrained cross-sectional configuration prior to installation has a diameter slightly greater than the width of the groove 98. When the hollow plastic insert 96 is forced into the groove 98, the teeth formed by the ends of the turns of the screw thread along the two sides of the groove 98 squeeze the insert laterally at longitudinally spaced points. In this manner, the insert is caused to bulge laterally at longitudinally spaced points into the valleys of the screw thread for interlocking engagement with the screw thread.

Fig. 9 shows an insert, generally designated 110, which comprises a tubular plastic sheath 112 and a solid metal core 114. The insert 110 is seated in a groove 115 and extends radially outward to the major diameter of the screw thread. The insert is anchored against longitudinal creepage by interlocking engagement with the ends of the screw thread along the two sides of the groove. To achieve this interlocking relationship, the insert 110 is slightly oversized relative to the width of the groove 115 in which it is seated. When the insert is forced into the groove, the teeth formed by the ends of the screw thread squeeze or gouge the insert to provide the desired interlocking engagement with the screw thread.

Fig. 10 shows an insert, generally designated 116, comprising a tubular plastic sheath 118 with a core 120 that is made of plastic material. The material of the core may be either harder or softer than the material of the sheath 118. The insert 116 is seated in a groove 122 and extends radially outwardly to approximately the major diameter of the screw thread. The insert 116, prior to installation, is of slightly greater diameter than the groove 122 so that the insert is squeezed or gouged by the screw thread ends into interlocking engagement with the screw thread.

Fig. 11 shows an insert, generally designated 124, that is mounted in a groove 125 in a position extending radially outward to the major diameter of the screw thread. The insert 124 comprises a tubular plastic sheath 126 encasing a core 128 in the form of a metal tube. The insert 124 extends radially outward to the major diameter of the screw thread and is slightly oversized with respect to the width of the groove 125 for interlocking engagement with the screw thread.

Fig. 12 shows a plastic insert 166 which may comprise any of the above described inserts. The insert 166 is seated in a longitudinal groove 162 and in interlocked with the ends of the turns of the screw thread adjacent the groove in the manner heretofore described. The longitudinal groove 162 is formed by a side milling cutter and has a tapered trailing end 164. The plastic insert 166 is correspondingly tapered at its trailing end as indicated at 168. The bottom wall of the groove 162 is inclined upwardly away from its trailing end, for example, at an angle of approximately 10° relative to the axis of the screw to cause the insert to be inclined at approximately the same angle. As shown in Fig. 12, the tapered leading end of the insert 166 lies radially inward from the crest diameter of the screw thread and the trailing end of the insert extends radially outward beyond the crest diameter. Consequently, when the screw is threaded into a nut, the resistance to the screw action rises at a relatively steep or abrupt gradient and continues to rise as the screw is advanced into the nut. Such a resistance gradient is shown diagrammatically by the curve 169 in Fig. 13 and is desirable in some uses of a self-locking screw.

Fig. 14 shows how a screw may be provided with a longitudinal groove 170 which inclines radially inwardly in the opposite direction toward its trailing end, for example at an inclination of 4° relative to the axis of the screw. The groove 170 may be formed by a side milling cutter to terminate in a tapered trailing end 172. A plastic insert 174 which may be of any of the previously described constructions has a corresponding taper 175 at its trailing end. The insert 174 is interlocked with the ends of the turns of the screw thread adjacent the groove 170 in the manner heretofore described. The leading end of the plastic insert 174 extends radially outwardly to approximately the pitch diameter of the screw thread, while the trailing end extends radially outward by a lesser distance. It has been found that a plastic insert may be mounted in an inclined groove in this general manner to result in an initial abrupt rise in resistance followed by substantially constant resistance as the screw is advanced into the cooperating nut. Fig. 15 shows a curve 176 which represents the manner in which the resistance to advance of the screw of Fig. 14 into a nut varies as the screw is advanced. This resistance effect is desirable for some installations.

Our description in specific detail of the selected practices of the invention will suggest various changes, substitutions and other departures from our disclosure within the spirit and scope of the appended claims.

We claim:

1. An interlocking screw for cooperation with a threaded female element, said screw comprising: a threaded shank having a longitudinal groove therein with the threads of the screw terminating at the edges of the groove; and an elongate insert of deformable resilient plastic material seated in said groove and extending into the radial zone of the threads of the screw and terminating radially at substantially the radial dimension of the crests of the threads with portions of the insert protruding laterally at a plurality of points on each side of the groove in interlocking engagement with portions of the screw threads immediately adjacent the groove before the screw is used, said insert when free from restraint having the configuration of a substantially solid rod having a transverse dimension greater than the width of the groove so that said insert is resiliently compressed in width by the groove and completely fills the same with consequent frictional resistance against lateral withdrawal of the insert from the groove, said laterally protruding portions anchoring said insert against bodily longitudinal movement in the groove, and whereby the insert is locally resiliently distorted longitudinally between the successive anchorage points by the threads of the female element in the course of advancement of the screw into the female element with consequent axial reaction thrust of the screw creating pressure contact of the threads of the screw axially against the threads of the female element, and whereby the screw also thrusts laterally in response to resilient distortion of the insert by the threads of the female element to press the threads of the screw diametrically into pressure contact with the threads of the female element along the longitudinal portion of the screw that is diametrically opposite from the insert.

2. An interlocking screw as set forth in claim 1, in which said groove has flat side walls and in which the rod forming said insert is solid and has a substantially circular cross-sectional configuration.

3. A self-locking screw as set forth in claim 1, in which said groove and said insert both extend to the leading end of said shank; and in which the leading end of said insert is tapered.

4. A self-locking screw as set forth in claim 1, in which the end of said groove towards the head of the screw is tapered in depth and in which the corresponding end of said insert is correspondingly tapered.

5. A fastening assembly for cooperation with a complementary threaded element, comprising: a fastening member having a portion with a screw thread for engagement with the thread of said complementary element; a longitudinal groove in said portion with the turns of said screw thread terminating at the edges of the groove, said groove being U-shaped in the sense that the spacing between the side walls of the groove at the bottom of the groove is at least as great as the spacing between the side walls at the longitudinal edges of the groove; an elongated insert of deformable resilient material bottomed in said groove and extending outwardly of the groove to at least the pitch diameter of the screw thread of the fastening member with portions of the insert protruding laterally at a plurality of points on each side of the groove in interlocking engagement with portions of the turns of the screw thread immediately adjacent the groove before the fastening member is used, said insert when free from restraint having a transverse dimension greater than the width of the groove so that said insert is resiliently compressed in width by the groove and completely spans in width and depth the portion of the groove below the root diameter of the threads with consequent frictional resistance against lateral withdrawal of the insert from the groove, said laterally protruding portions anchoring said insert against bodily longitudinal movement in the groove, whereby the insert is locally resiliently distorted longitudinally between the successive anchorage points by the screw thread of said complementary threaded element in the course of advancement of the screw engagement of the fastening member with the complementary element with consequent axial reaction thrust between the fastening member and the complementary element creating pressure contact of the turns of the thread of the fastening member axially against the turns of the screw thread of the complementary element, and whereby the fastening member also thrusts laterally in response to resilient distortion of the insert by the turns of the screw thread of the complementary element to press the turns of the screw thread of the fastening member diametrically into pressure contact with the turns of the screw thread of the complementary element along the longitudinal portion of the fastening member that is diametrically opposite from the insert.

6. A fastening assembly as set forth in claim 5 in which the insert extends outwardly of the groove and terminates radially at substantially the radial dimension of the crests of the turns of the screw thread of the fastening member.

7. A fastening assembly as set forth in claim 5 in which said insert is of generally tubular configuration.

8. A fastening assembly as set forth in claim 5 in which said insert is a two-piece insert comprising an outer member of said deformable resilient material and an inner core member of harder material.

9. A fastening assembly as set forth in claim 8 in which said core is made of plastic material.

10. A fastening assembly as set forth in claim 8 in which the core is made of metal.

11. A fastening assembly as set forth in claim 5 in which the exposed outer surface of said insert is inclined outwardly from said groove towards the trailing end of the insert for progressive increase in resistance to relative advancement of said portion of the fastening member into threaded engagement with said complementary element.

12. A fastening assembly as set forth in claim 5 in which the outer surface of said insert is inclined outwardly of said groove towards the leading end of the fastening member whereby the insert initially offers substantial resistance to relative advancement of said portion of the fastening member into threaded engagement with the complementary element without substantial increase in resistance to continued relative advancement of said portion of the fastening member into threaded engagement with the complementary element.

13. A fastening assembly as set forth in claim 8 in which the core is a hollow metal member.

References Cited in the file of this patent

UNITED STATES PATENTS

| | | |
|---|---|---|
| 2,409,638 | Lyon | Oct. 22, 1946 |
| 2,663,344 | Burdick | Dec. 22, 1953 |